Patented Feb. 10, 1948

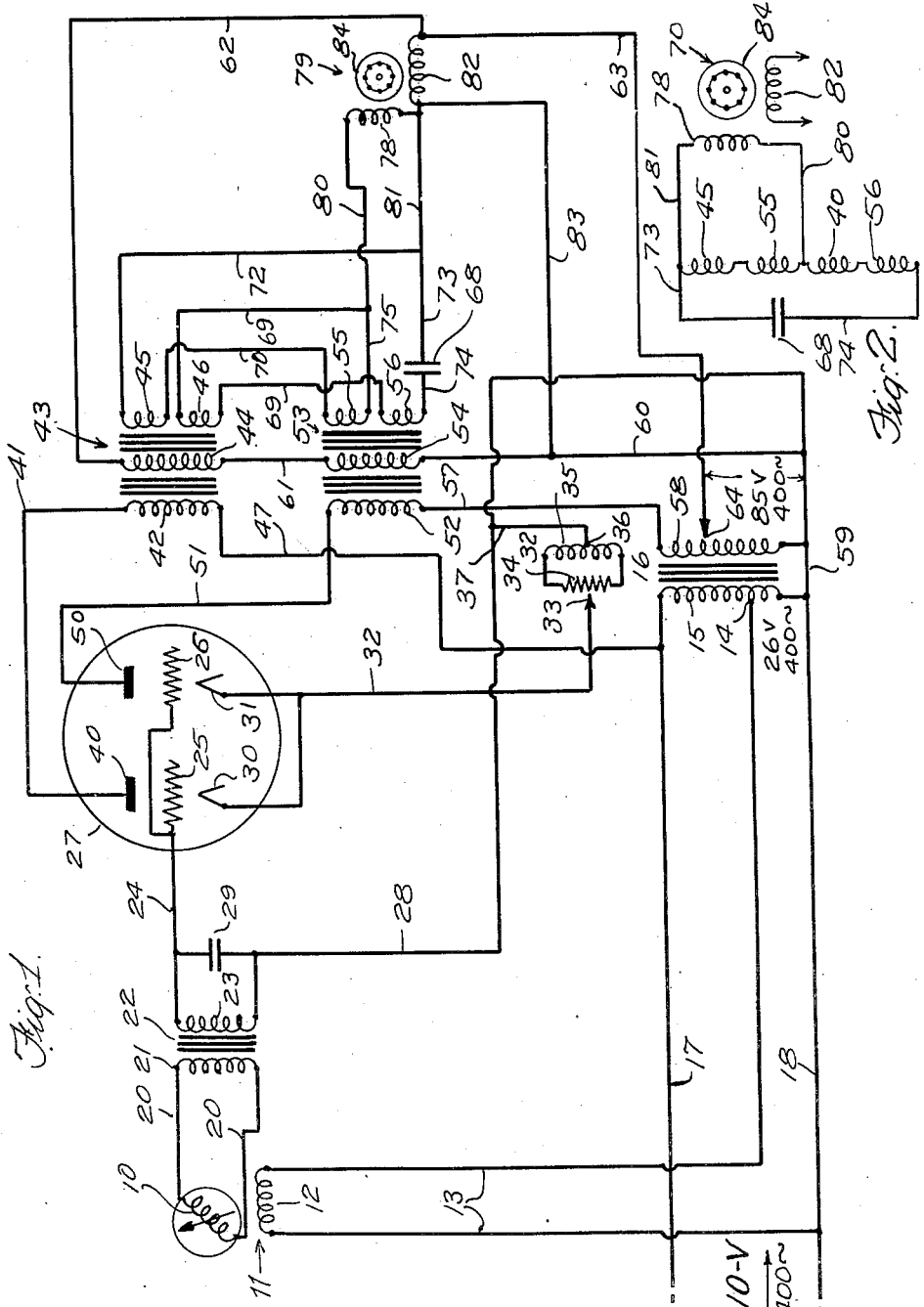

2,435,926

UNITED STATES PATENT OFFICE 2,435,926

CONTROL CIRCUIT FOR INDUCTION MOTORS

Walter J. Krupick, Franklin, N. J., assignor, by mesne assignments, to Kearfott Company, Inc., New York, N. Y., a corporation of New York Application August 8, 1946, Serial No. 689,115

4 Claims. (Cl. 318—207)

This invention relates to a motor control circuit and more particularly to a circuit including a magnetic amplifier for supplying the control winding of a reversible induction motor.

An object of the invention is to provide a control circuit of the above type having novel and improved operating characteristics.

Another object is to provide a circuit of the above type in which the size of the phasing condenser is reduced to a small value as compared to the size required when the condenser is connected directly across the control winding of the induction motor.

Various other objects and advantages will be apparent as the nature of the invention is more fully disclosed.

Although the novel features which are believed to be characteristic of this invention are pointed out more particularly in the claims appended hereto, the nature of the invention will be better understood by referring to the following description, taken in connection with the accompanying drawings forming a part thereof in which a specific embodiment has been set forth for purposes of illustration.

In the drawings:

Fig. 1 is a schematic diagram of a control circuit embodying the present invention; and Fig. 2 is a schematic diagram of a portion of the circuit in simplified form.

Referring to Fig. 1, a signal of controlled voltage and reversible phase is supplied from the rotor 10 of a variometer 11 having a stator 12 supplied by line 13 from an alternating voltage source such as a 26 volt 400 cycle source. In the embodiment shown this source is derived from a tap 14 on the primary 15 of a transformer 16 which is supplied by lines 17 and 18 from a suitable voltage source such as 110 volts 400 cycle source.

The rotor 10 is connected by lines 20 to the primary 21 of a transformer 22 having a secondary 23 one side of which is connected by a line 24 to control grids 25 and 26 of a double element tube 27, and the other side of which is connected by a line 28 to the return line 18. A condenser 29 is connected across the secondary 23 for controlling the operation thereof. The cathodes 30 and 31 of the tube 27 are connected by a common lead 32 to a variable tap 33 of a resistor 34 which is connected across a secondary 35 of the transformer 16. The mid-point 36 of the secondary 35 is connected by a lead 37 to the return line 28.

One anode 40 of the tube 27 is connected by a lead 41 to a saturating winding 42 of a saturable core transformer 43 having a primary winding 44 and a pair of secondary windings 45 and 46. The return side of the saturating winding 42 is connected by a lead 47 to the lead 17 on the primary side of the transformer 16. A second anode 50 of the tube 27 is connected by a lead 51 to a saturating winding 52 of a saturable core transformer 53 having a primary winding 54 and a pair of secondary windings 55 and 56. The return side of the saturating winding 52 is connected by a lead 57 to one side of a secondary 58 of the transformer 16, the other side of which is connected by a lead 59 to the supply line 18.

The primaries 44 and 54 of the transformers 43 and 53 are connected in series by leads 60, 61, 62 and 63 across a portion of the secondary 58 between a variable tap 64 and the return lead 59. The tap 64 may for example be adjusted to provide 85 volts for the primaries 44 and 54.

The secondaries 45, 55, 46 and 56 are connected in series circuit with a condenser 68 by leads 69 to 75. The secondaries 45 and 55 are connected in series across a control winding 78 of an induction motor 79 by means of leads 80 and 81. The induction motor 79 is provided with a fixed phase field winding 82 which is connected across the 85 volt tap 64 on the return side of the secondary 58 by means of leads 63 and 83. The induction motor 79 is provided with a rotor 84 of the squirrel cage type which is caused to rotate in a direction dependent upon the relative phases of the currents in the windings 78 and 82.

The secondaries 55 and 56 are connected to oppose the voltages in secondaries 45 and 46, so that when the voltages in the two sets of secondaries are equal no resultant voltage will be applied to the control winding 78 of the motor 79. However, when one of these voltages is increased and the other decreased due to an unbalance in the saturation of the two transformers 43 and 53. the greater voltage will predominate and will be applied to the winding 78 as a control voltage for the motor 79 and will thereby cause the motor to operate in a direction which is dependent upon whether the voltage in the secondaries of the transformer 43 or the voltage in the secondaries of the transformers 53 predominate.

The circuit is arranged so that with a zero signal applied to the grids 25 and 26 equal currents flow in the paths including the saturating windings 42 and 52 and the two transformers 43 and 53 are balanced, thereby supplying no voltage to the control winding 78 of the motor 79.

Rotation of the rotor 10 in one direction or the other, either manually or as a result of a follow-up device causes a signal to be applied to the grids 25 and 26 in the nature of an alternating voltage the phase of which depends upon the direction of rotation of the rotor 10 from its zero signal position. Inasmuch as the anodes 40 and 50 of the tube 27 are supplied with an alternating voltage of the same frequency, but of opposite phase, inasmuch as one anode is supplied from the secondary 58 and the other from the primary 15 of the transformer 16, different space currents will flow in the two space current paths depending upon the relative phasing of the anode voltages and the grid voltages in the two space current paths. Hence, an increased current will flow through one of the saturating windings and a reduced current through the other, thereby unbalancing the operation of the saturable core transformers 43 and 53 and supplying a control voltage to the winding 78 of the motor 79 which varies in phase according to the phase of the input signal received from the rotor 10 of the variometer. This control voltage causes the rotor 84 to rotate in one direction or the other depending upon the phase relationship between the voltages in the two windings 82 and 78.

In the schematic diagram shown in Fig. 2, the secondaries 45 and 46, 55 and 56, condenser 68 and winding 78 are shown in simplified form. It will be noted from this diagram that the condenser 68 is connected across all four secondaries, whereas the winding 78 is connected across two opposed secondaries. The condenser 68 is of a value such that the current in the winding 78 is 90° displaced in phase from the current in the winding 82. If a condenser sufficient for this purpose were connected directly across the winding 78, a value of several mfd. would be required. However, by adding a high voltage secondary winding to the saturable core transformer and connecting the condenser across this winding, its capacity is reduced to a small value, such as a few tenths of one mfd. The above circuit accordingly reduces the condenser to a practical size and simplifies the operation of the control motor.

It is to be understood of course that the saturable core transformer may be used for other purposes where a voltage of controlled phase is required. Although a specific embodiment of the invention has been shown for purposes of illustration, the invention is not to be restricted thereto, but is only to be limited in accordance with the scope of the following claims.

What is claimed is:

1. A control circuit for producing an alternating control voltage of controllable phase, comprising a pair of saturable core transformers each having a saturating winding, a primary winding and a pair of secondary windings, connections connecting the individual secondary windings of one pair respectively in series opposition with the individual secondary windings of the second pair to form two series connected pairs of windings, connections connecting the two last pairs in series, a phasing condenser connected across the four series connected windings, and an output circuit connected across one of said series connected pairs of windings.

2. A control circuit for producing an alternating control voltage of controllable phase, comprising a pair of saturable core transformers each having a saturating winding, a primary winding and a pair of secondary windings, connections connecting the individual secondary windings of one pair respectively in series opposition with the individual secondary windings of the second pair to form two series connected pairs of windings, connections connecting the two last pairs in series, a phasing condenser connected across the four series connected windings, and an output circuit connected across one of said series connected pairs of windings, means including space discharge tubes having a pair of space current paths connected to the respective saturating windings and supplied by alternating current voltages 180° out of phase and having control grids supplied by an alternating voltage of like frequency, and means varying the relative phase of the grid and space current path voltages for differentially varying the respective space currents for control purposes.

3. A control circuit for producing an alternating control voltage of controllable phase, comprising a pair of saturable core transformers each having a saturating winding, a primary winding and a pair of secondary windings, connections connecting the individual secondary windings of one pair respectively in series opposition with the individual secondary windings of the second pair to form two series connected pairs of windings, connections connecting the two last pairs in series, a phasing condenser connected across the four series connected windings, and an output circuit connected across one of said series connected pairs of windings, means including space discharge tubes having a pair of space current paths connected to the respective saturating windings and supplied by alternating current voltages 180° out of phase and having control grids supplied by an alternating voltage of like frequency, and means varying the relative phase of the grid and space current path voltages for differentially varying the respective space current for control purposes, and a reversible induction motor having a control winding connected to said output circuit.

4. A control circuit for a reversible induction motor having a fixed phase winding and a control winding, comprising a pair of saturable core transformers each having a saturating winding, a primary winding and a pair of secondary windings, connections connecting the individual secondary windings of one pair respectively in series opposition with the individual secondary windings of the second pair to form two series connected pairs of windings, connections connecting the two last pairs in series, a phasing condenser connected across the four series connected windings, said control winding being connected across one of said series connected pairs of windings.

WALTER J. KRUPICK.